US011940847B2

(12) United States Patent
Yoon et al.

(10) Patent No.: US 11,940,847 B2
(45) Date of Patent: Mar. 26, 2024

(54) METHOD FOR CONTROLLING FLEXIBLE DISPLAY, AND ELECTRONIC DEVICE

(71) Applicant: SAMSUNG ELECTRONICS CO., LTD., Suwon-si (KR)

(72) Inventors: Jonggeun Yoon, Suwon-si (KR); Jebin Lee, Suwon-si (KR); Pilwon Seo, Suwon-si (KR); Jiyoung Kim, Suwon-si (KR); Jiwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/295,496

(22) Filed: Apr. 4, 2023

(65) Prior Publication Data
US 2023/0236637 A1 Jul. 27, 2023

Related U.S. Application Data

(63) Continuation of application No. PCT/KR2021/015064, filed on Oct. 26, 2021.

(30) Foreign Application Priority Data

Nov. 6, 2020 (KR) .................. 10-2020-0148097

(51) Int. Cl.
*G06F 1/16* (2006.01)
*G06F 3/02* (2006.01)
(Continued)

(52) U.S. Cl.
CPC .......... *G06F 1/1652* (2013.01); *G06F 1/1624* (2013.01); *G06F 1/1677* (2013.01);
(Continued)

(58) Field of Classification Search
None
See application file for complete search history.

(56) References Cited

U.S. PATENT DOCUMENTS

| 9,712,777 | B2 | 7/2017 | Yeo et al. |
| 10,048,758 | B2 | 8/2018 | Modarres et al. |

(Continued)

FOREIGN PATENT DOCUMENTS

| JP | 2004094343 A | 3/2004 |
| JP | 2012173542 A | 9/2012 |

(Continued)

OTHER PUBLICATIONS

International Search Report for PCT/KR2021/015064 dated Feb. 18, 2022, 5 pages.

(Continued)

*Primary Examiner* — Christopher J Kohlman
(74) *Attorney, Agent, or Firm* — Nixon & Vanderhye, P.C.

(57) ABSTRACT

This electronic device may comprise: a flexible display; a first rolling actuator configured to extend the flexible display in a first direction; a second rolling actuator configured to extend the flexible display in a second direction opposite to the first direction; and at least one processor. The at least one processor may be configured to: determine the mounting state of the electronic device; acquire information about the position of a peripheral device, which is linked with the electronic device, based on the mounting state satisfying a designated condition; set the extension direction of the flexible display on the basis of the information about the position of the peripheral device; and control the first rolling actuator and/or the second rolling actuator to extend the flexible display in the first direction and/or the second direction on the basis of the set extension direction.

15 Claims, 16 Drawing Sheets

(51) Int. Cl.
*G06F 3/0346* (2013.01)
*G06F 3/0354* (2013.01)
*G06F 3/038* (2013.01)
*G09G 3/00* (2006.01)

(52) U.S. Cl.
CPC .............. *G06F 3/02* (2013.01); *G06F 3/0346* (2013.01); *G06F 3/03545* (2013.01); *G06F 3/038* (2013.01); *G09G 3/035* (2020.08); *G09G 2354/00* (2013.01)

(56) References Cited

U.S. PATENT DOCUMENTS

| | | |
|---|---|---|
| 10,403,241 B2 | 9/2019 | Kim et al. |
| 10,452,106 B2 | 10/2019 | Cho et al. |
| 10,488,957 B2 | 11/2019 | Kim et al. |
| 10,911,586 B2 | 2/2021 | Kim et al. |
| 11,348,490 B1 | 5/2022 | Kwak et al. |
| 2007/0247798 A1* | 10/2007 | Scott, II ............... G06F 1/1647 361/679.04 |
| 2014/0002430 A1 | 1/2014 | Kwack et al. |
| 2015/0185866 A1 | 7/2015 | Im |
| 2016/0358552 A1 | 12/2016 | Wang et al. |
| 2017/0212607 A1 | 7/2017 | Yoon |
| 2020/0212326 A1* | 7/2020 | Eom ...................... H10K 59/12 |

FOREIGN PATENT DOCUMENTS

| | | |
|---|---|---|
| JP | 6189990 B1 | 8/2017 |
| JP | 2018028954 A | 2/2018 |
| JP | 2019117649 A | 7/2019 |
| KR | 20110048705 A | 5/2011 |
| KR | 20140001490 A | 1/2014 |
| KR | 101509490 B1 | 4/2015 |
| KR | 20150077667 A | 7/2015 |
| KR | 20160019599 A | 2/2016 |
| KR | 20170089664 A | 8/2017 |
| KR | 20170090295 A | 8/2017 |
| KR | 20170090851 A | 8/2017 |
| KR | 102247667 B1 | 5/2021 |
| KR | 102375469 B1 | 3/2022 |

OTHER PUBLICATIONS

Written Opinion of the ISA for PCT/KR2021/015064 dated Feb. 18, 2022, 4 pages.

* cited by examiner

METHOD FOR CONTROLLING FLEXIBLE DISPLAY, AND ELECTRONIC DEVICE

CROSS-REFERENCE TO RELATED APPLICATIONS

This application is a continuation of International Application No. PCT/KR2021/015064 designating the United States, filed on Oct. 26, 2021, in the Korean Intellectual Property Receiving Office and claiming priority to Korean Patent Application No. 10-2020-0148097, filed on Nov. 6, 2020, in the Korean Intellectual Property Office, the disclosures of which are incorporated by reference herein in their entireties.

BACKGROUND

Field

The disclosure relates to a method for controlling a flexible display and an electronic device.

Description of Related Art

Most portable tablet devices adopt a large screen to provide many interactions and information through a display. Furthermore, the increase in screen size makes it possible for the portable tablet devices to provide a function of dividing one screen to provide two or more interfaces.

In addition, rapid development of electronic devices has led to development of peripheral devices of the electronic devices. As the peripheral devices, input/output devices such as an electronic pen and a wireless earphone have been proposed. For example, a user may input desired information to a touch screen in a manner of touching the touch screen of an electronic device using an electronic pen.

As the number of functions provided by portable tablet devices increases, the need for a method for providing an interface to a user through a display having a limited size has emerged.

An increase in display size in a portable tablet device causes the portable tablet device to divide one screen to provide two or more interfaces. However, continuous increase in display size may lead increase in overall size of the portable tablet device, which is not desirable in terms of portability and cost.

Furthermore, even in case a peripheral device (e.g., an electronic pen and a portable terminal) linked with the portable table device is used, the potable tablet device is required to display an interface related to the peripheral device instead of an existing interface or display same in an overlapping manner. Accordingly, when used linked with the peripheral device, the portable tablet device was not able to provide an effective interaction due to a limited size of a display.

SUMMARY

Embodiments of the disclosure may provide an electronic device and a method for controlling an electronic which may determine a mounting state of the electronic device, acquire position information of a peripheral device, extend a flexible display, and display a user interface on one surface of the extended display.

An electronic device according to an example embodiment of the disclosure may include: a flexible display, a first rolling actuator configured to extend the flexible display in a first direction, a second rolling actuator configured to extend the flexible display in a second direction opposite to the first direction, and at least one processor. The at least one processor may be configured to: determine a mounting state of the electronic device, acquire position information of a peripheral device linked with the electronic device, based on the mounting state satisfying a designated condition, determine an extension direction of the flexible display based on the information about the position of the peripheral device, and control the first rolling actuator or the second rolling actuator to extend the flexible display in the first direction or the second direction based on the determined extension direction.

A method of operating an electronic device according to an example embodiment disclosed herein may include: determining a mounting state of the electronic device, acquiring position information of a peripheral device linked with the electronic device, based on the mounting state satisfying a designated condition, determining an extension direction of a flexible display based on the information about the position of the peripheral device, and using a first rolling actuator or a second rolling actuator to extend the flexible display in a first direction or a second direction opposite to the first direction based on the determined extension direction.

An electronic device according to an example embodiment of the disclosure may include: a flexible display, at least one rolling actuator configured to extend the flexible display, and at least one processor electrically connected to the flexible display and the at least one rolling actuator. The at least one processor may be configured to: determine a mounting state of the electronic device, detect an extension event of the flexible display based on the mounting state satisfying a designated condition, determine an extension direction of the flexible display based on the extension event, and control the at least one rolling actuator to extend the flexible display based on the determined extension direction.

According to various example embodiments of the disclosure, a portable tablet device may automatically extend a flexible display in response to an extension event.

According to various example embodiments, the portable tablet device may provide more interactions through an extended area of the flexible display.

According to various example embodiments, the portable tablet device may increase availability of a peripheral device operatively connected to an electronic device.

In addition, various effects directly or indirectly identified through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described with reference to the accompanying drawings. However, this is not intended to limit the disclosure to specific embodiments, and it should be understood that various modifications, equivalents, and/or alternatives of the embodiments of the disclosure are included.

Figure 1A:
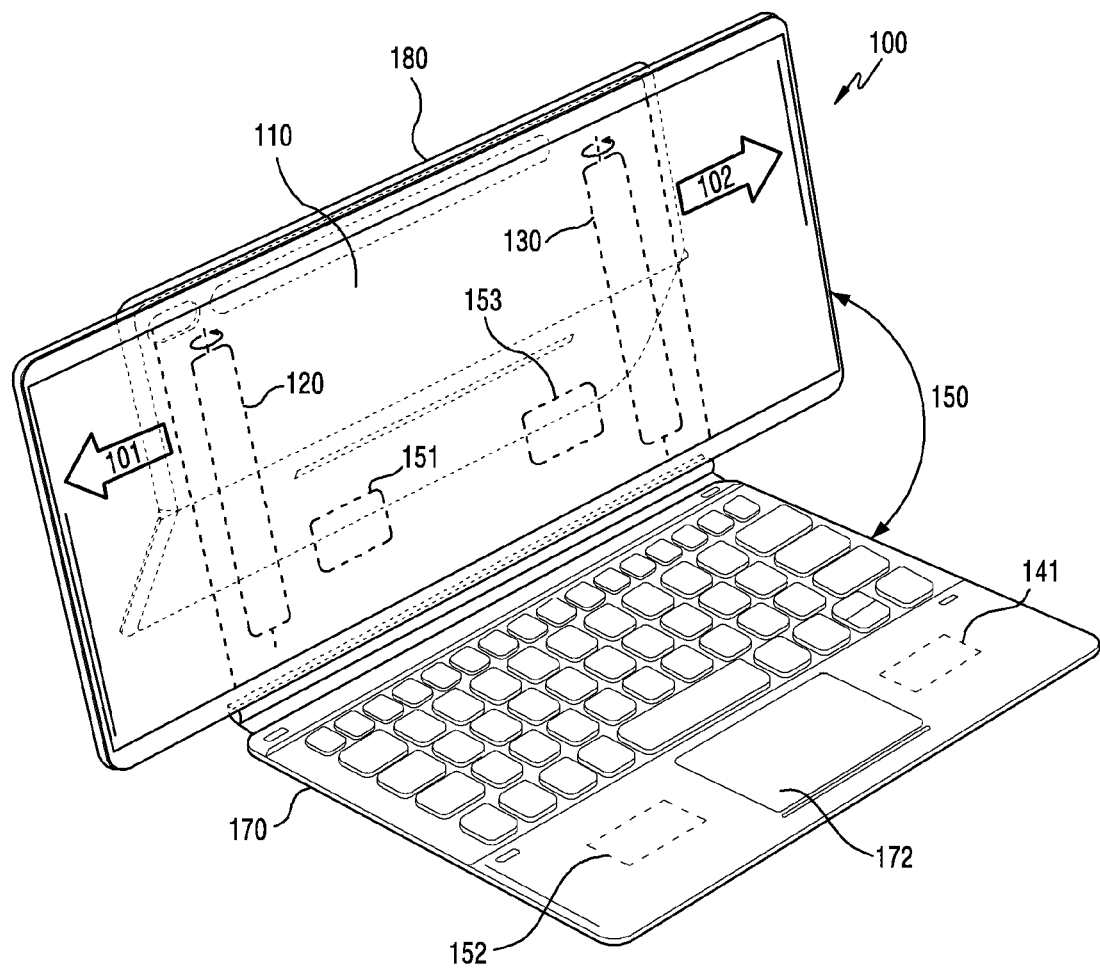
FIG. 1A is a perspective view illustrating an electronic device according to various embodiments.
Figure 1B:
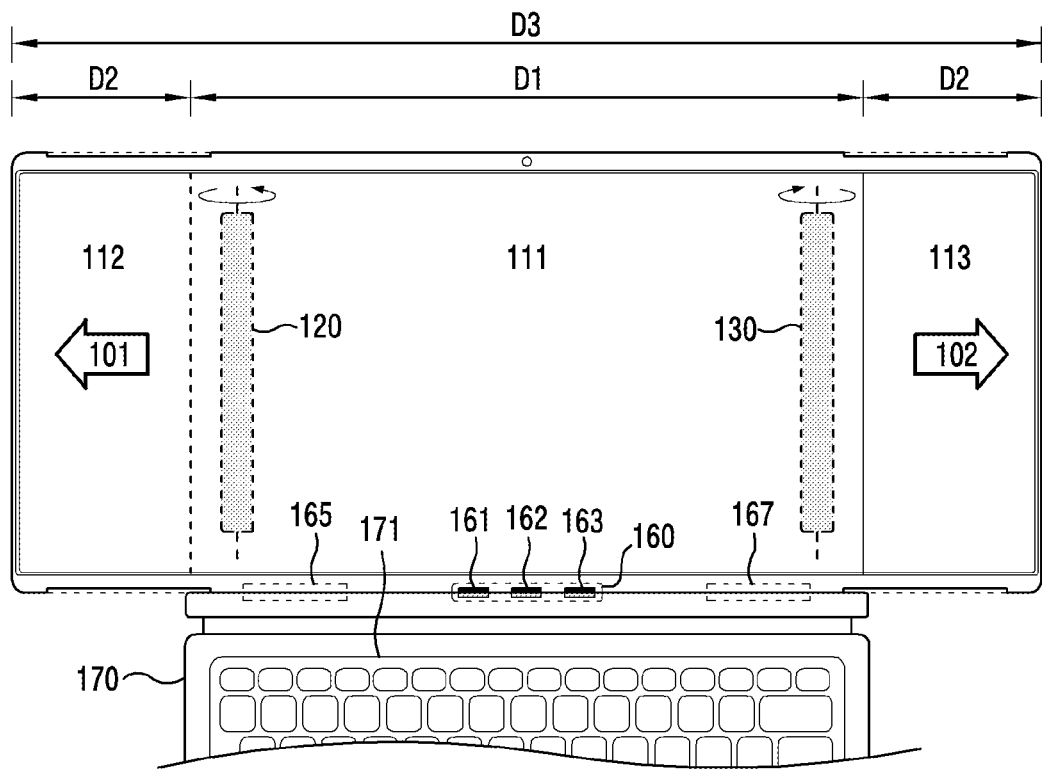
FIG. 1B is a diagram illustrating a front view of an electronic device according to various embodiments.
Figure 1C:
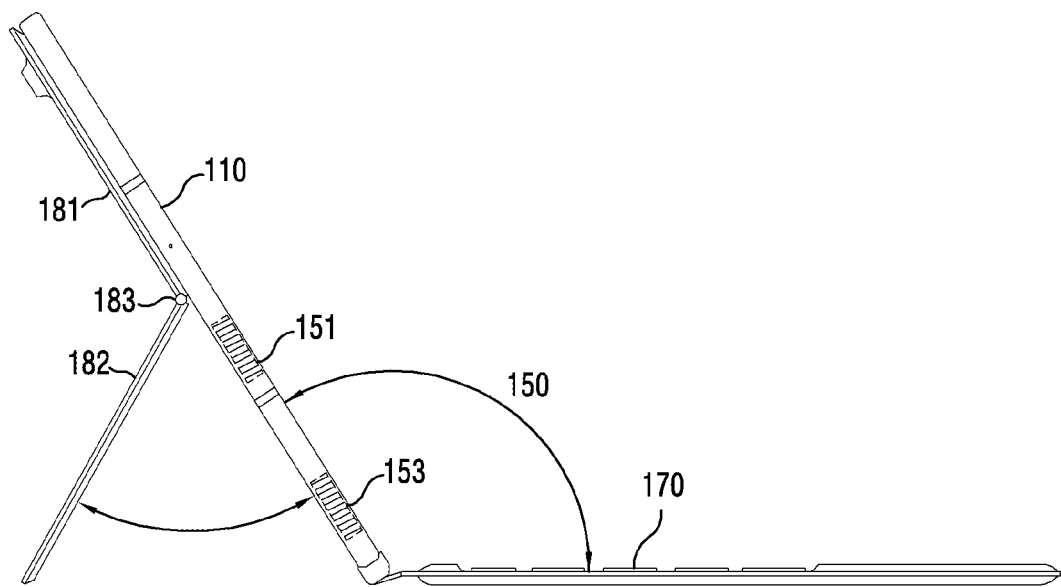
FIG. 1C is a diagram illustrating a lateral view of an electronic device according to various embodiments.

FIG. 1A is a perspective view illustrating an electronic device (e.g., the electronic device 1101 in FIG. 11) 100 according to various embodiments. FIG. 1B is a diagram illustrating a front view of an electronic device 100 according to various embodiments. FIG. 1C is a diagram illustrating a lateral view of an electronic device 100 according to various embodiments.

Referring to FIG. 1A, FIG. 1B, and FIG. 1C, in an embodiment, the electronic device 100 may include a flexible display (e.g., the display module 1160 in FIG. 11) 110, a first rolling actuator 120, a second rolling actuator 130, a first acceleration sensor 151, and a first magnetic field sensor 153.

In an embodiment, the electronic device 100 may include a cover 180 attached to one surface (e.g., the rear surface) of the electronic device 100 and the cover 180 may protect a surface (e.g., the rear surface) of the electronic device 100 from an external impact. Referring to FIG. 1C, a first cover area 181 and a second cover area 182 of the cover 180 according to an embodiment may be attached to a surface (e.g., the rear surface) of the electronic device 100 in different manners. For example, the first cover area 181 may be attached to a surface (e.g., the rear surface) of the electronic device 100 through a permanent magnet and/or an adhesive tape and the second cover area 182 may be attached to a surface (e.g., the rear surface) of the electronic device 100 through a permanent magnet. According to an embodiment, the cover 180 may be referred to as a book cover or a back cover.

In an embodiment, the cover 180 may include the first cover area 181 and the second cover area 182 with reference to a portion of a cover hinge 183, and the first cover area 181 and the second cover area 182 may be rotatably coupled to form a specific angle with reference to the cover hinge 183. For example, in a state in which the first cover area 181 is attached to the rear surface of the electronic device 100, the second cover area 182 may rotate by a predetermined angle with reference to the first cover area 181 through the cover hinge 183. According to an embodiment, in a state in which the second cover area 182 rotates by a predetermined angle, one end of the second cover area 182 may come in contact with other objects such as a ground, a desk, or the like to fix the electronic device 100 at a specific angle. According to an embodiment, in a state in which the second cover area 182 and the first cover area 181 form a predetermined angle (e.g., 180 degrees) therebetween, one end of the second cover area 182 may have a form of being connected to or contact with at least one surface (e.g., an outer lateral surface of a keyboard device 170) of the keyboard device 170 including a keyboard 171.

In an embodiment, although the cover 180 is illustrated to include a single-axis hinge structure with reference to FIG. 1A to FIG. 1C, according to an embodiment, the cover 180 may include a multi-joint hinge structure other than the single-axis hinge structure. In addition, according to an embodiment, the cover 180 may include various structure to allow the first cover area 181 and the second cover area 182 to be rotated.

In an embodiment, the cover hinge 183 may be omitted from the cover 180. According to an embodiment, the first cover area 181 and the second cover area 182 are connected through a flexible member so that the first cover area 181 and the second cover area 182 may be coupled to be mutually rotatable without a hinge structure. For another example, an area at which the first cover area 181 and the second cover area 182 are connected is formed to have a thickness thinner than that of the first cover area 181 and/or the second cover area 182 so that the first cover area 181 and the second cover area 182 may be coupled to be mutually rotatable without a hinge.

Referring to FIG. 1A and FIG. 1B, in an embodiment, the keyboard device 170 may include the keyboard 171, a touch pad 172, a second acceleration sensor 152, and a first magnet 141. According to an embodiment, the keyboard 171 and the touch pad 172 may be configured on a surface of the keyboard device 170 so as to acquire a user input. According to an embodiment, a cushion cover may be included in at least a portion of one surface (e.g., a surface on which the keyboard 171 is disposed) of the keyboard device 170 to minimize and/or reduce an impact caused when the electronic device 100 and the keyboard device 170 are folded. According to an embodiment, the keyboard device 170 may be referred to as a front cover, a front book cover, a keyboard cover, or a keyboard book cover.

In an embodiment, the electronic device 100 may include the first rolling actuator 120 and the second rolling actuator 130. According to an embodiment, the first rolling actuator 120 may be disposed adjacent to a first lateral surface of the electronic device 100. According to an embodiment, the second rolling actuator 120 may be disposed adjacent to a second lateral surface of the electronic device 100. The second lateral surface may be a lateral surface disposed opposite to the first lateral surface.

In an embodiment, the electronic device 100 may drive the first rolling actuator 120 to extend the flexible display 110 in a first direction 101. In an embodiment, the electronic device 100 may drive the second rolling actuator 130 to extend the flexible display 110 in a second direction 102. According to an embodiment, the second direction 102 may be opposite to the first direction 101.

In an embodiment, in case the electronic device 100 is in a basic state in which the flexible display 110 is not extended, the flexible display 110 may have a first length D1. According to an embodiment, the electronic device 100 may drive the first rolling actuator 120 to extend the flexible display 110 in the first direction 101 by a second length D2. According to an embodiment, the electronic device 100 may drive the second rolling actuator 130 to extend the flexible display 110 in the second direction 102 by the second length D2.

According to an embodiment, in case the flexible display 110 is extended only in one direction, the flexible display 110 may have a third length D1+D2.

According to an embodiment, in case the flexible display 110 is extended in both directions, the flexible display 110 may have a fourth length D3. For example, the fourth length D3 may correspond to a length D1+2×D2 obtained by adding the first length D1 to the second length D2 twice. With respect to the length, the aforementioned description may be similarly or identically referred to drawings below.

In an embodiment, the electronic device 100 and the keyboard device 170 may include a first coupling area 165 and a second coupling area 167.

According to an embodiment, a magnet may be mounted on the first coupling area 165 and the second coupling area 167 to allow the electronic device 100 and the keyboard device 170 to be attached to or detached from same. For example, a user may make the keyboard device 170 physically coupled to or separated from a later surface of the electronic device 100 through the first coupling area 165 and the second coupling area 167 according to an embodiment.

In an embodiment, the electronic device 100 and the keyboard device 170 may include a connector module 160. For example, the connector module 160 may include a 3 pin pogo connector.

According to an embodiment, the connector module 160 may include a first connector 161, a second connector 162, and a third connector 163.

According to an embodiment, the first connector 161 may serve as a ground between the electronic device 100 and the keyboard device 170.

According to an embodiment, the electronic device 100 may exchange a data communication signal (e.g., a USRT signal) with the keyboard device 170 through the second connector 162. For example, in a state in which the electronic device 100 and the keyboard device 170 are physically and/or electrically coupled through the connector module 160, motion data acquired through a user input and/or the second acceleration sensor 152 may be transferred to the electronic device 100 through the second connector 162.

According to an embodiment, the user input may include a user input through the keyboard 171 and the touch pad 172.

According to an embodiment, the motion data may be referred to as sensor data. The same may be applied below.

According to an embodiment, the third connector 163 may be a connector for applying power to the keyboard device 170 from the electronic device 100. According to an embodiment, the keyboard device 170 may not include a self-powered module (e.g., a battery) and thus in case the electronic device 100 is powered on, the keyboard device 170 may receive power through the third connector 163.

Hereinafter, for the convenience of the description, various embodiments will be described based on the electronic device 100 shown in FIG. 1A to FIG. 1C.

Figure 2A:
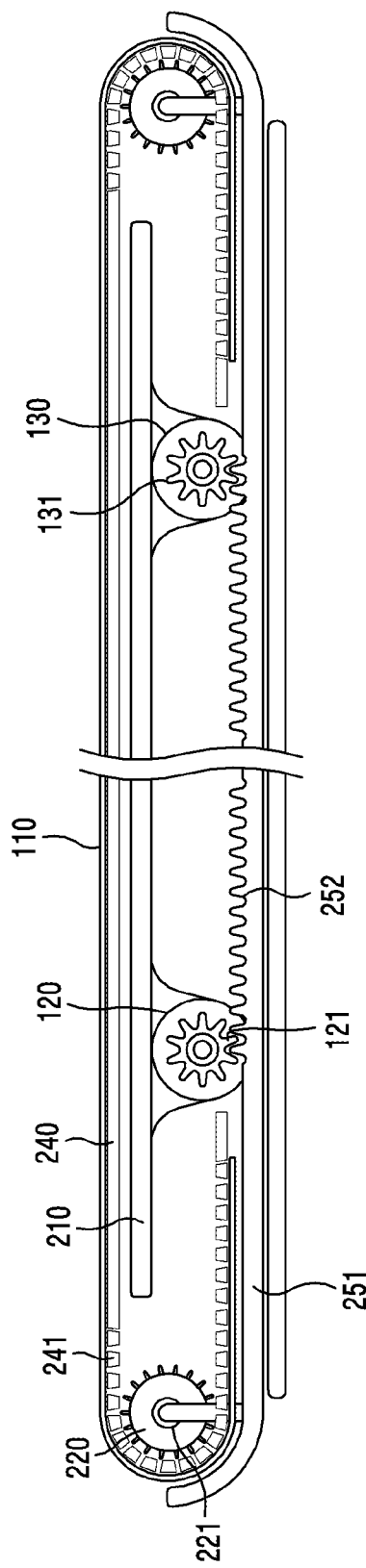
FIG. 2A is a sectional view of an electronic device illustrating a state in which a flexible display is not extended according to various embodiments.
Figure 2B:
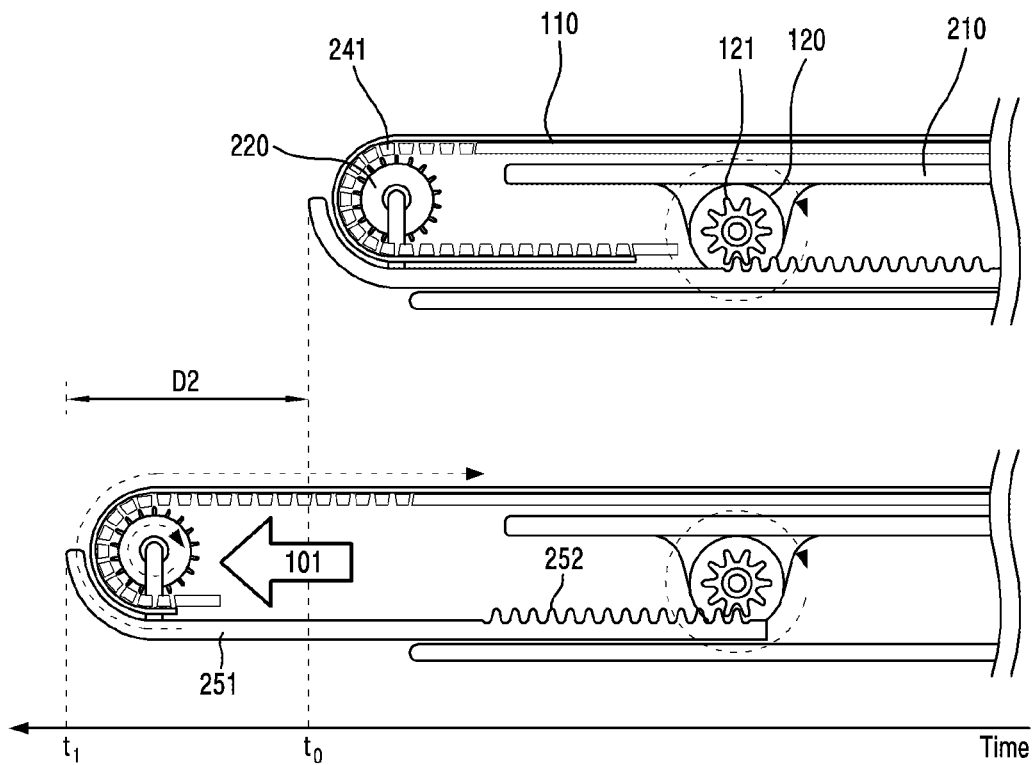
FIG. 2B is a sectional view illustrating a portion of an electronic device according to various embodiments.
Figure 2C:
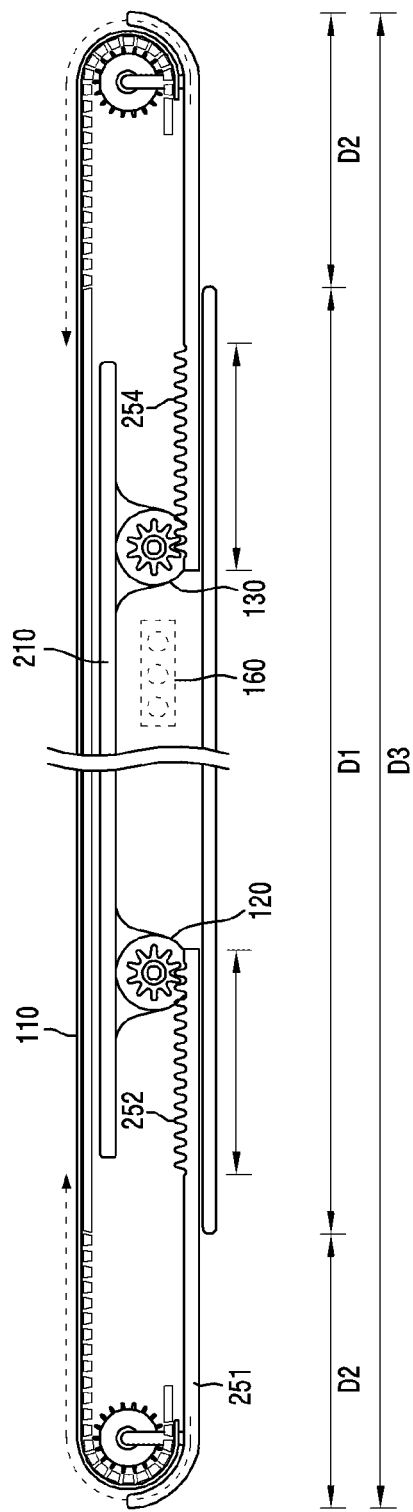
FIG. 2C is a sectional view illustrating an electronic device in a state in which a flexible display is extended in a first direction and a second direction according to various embodiments.

FIG. 2A is a sectional view illustrating an electronic device 100 in a state in which a flexible display 110 is not extended according to various embodiments. FIG. 2B is a sectional view illustrating a portion of an electronic device 100 according to various embodiments. FIG. 2C is a sectional view illustrating an electronic device 100 in a state in which a flexible display 110 is extended in a first direction 101 and a second direction 102 according to various embodiments.

According to an embodiment, the first rolling actuator 120 and the second rolling actuator 130 are symmetric based on the center of the electronic device 100, and hereinafter, a description for the first rolling actuator 120 may be applied the same or similarly to that of the second rolling actuator 130.

Referring to FIG. 2A to FIG. 2C, the electronic device 100 may include the first rolling actuator 120, the second rolling actuator 130, a first plate 240, a second plate 241, and/or the flexible display 110.

In an embodiment, the flexible display 110 may include an OLED layer for displaying a screen and a transparent layer (e.g., ultra-thin glass) for protecting the OLED layer. According to an embodiment, the first plate 240 and the second plate 241 may be disposed in a lower direction of the OLED layer of the flexible display 110.

According to an embodiment, the lower direction of the flexible display 110 may correspond to a rear surface direction of the flexible display 110 when viewing the electronic device 100 from the front.

In an embodiment, the first plate 240 may be connected to the second plate 241. In an embodiment, the second plate 241 may be referred to as a multi-plate. For example, the multi-plate 241 may include multiple long rod-shaped plates and multiple grooves may be formed between the multiple plates. In an embodiment, the multiple plates may be realized in a form connected to a hinge structure to be bent.

According to an embodiment, the multiple grooves of the multi-plate 142 may be engaged with multiple protrusions of the roller 220 to function as a gear.

In an embodiment, the second plate 241 may include multiple openings to secure flexibility for bending. According to an embodiment, the multiple openings may be realized in various forms. For example, the multiple openings may be realized in cylindrical shot openings or realized in rod-shaped long openings. According to an embodiment, the second plate 241 may be engaged with multiple protrusions of a roller 220 through the multiple grooves.

In an embodiment, the second plate 241 may secure flexibility to be bent by varying thicknesses of each portion of the second plate 241. For example, the second plate 241 may be bent through multiple thin portions and the multiple thin portions may function as grooves to be engaged with the multiple protrusions of the roller 220.

In an embodiment, the electronic device 100 may include multiple rolling actuators capable of selective control of an extension direction of the display 110. According to an embodiment, the multiple rolling actuators may include the first rolling actuator 120 and the second rolling actuator 130.

According to an embodiment, the first rolling actuator 120 may be disposed adjacent to a lateral surface (e.g., a left lateral surface) of the electronic device 100.

According to an embodiment, the second rolling actuator 130 may be disposed adjacent to a lateral surface (e.g., a right lateral surface) of the electronic device 100, and may include a rotation gear 131.

According to an embodiment, the first rolling actuator 120 may extend or contract the flexible display 110 in the first direction 101. According to an embodiment, the second rolling actuator 130 may extend or contract the flexible display 110 in the second direction 102.

According to an embodiment, the first direction 101 may be a direction corresponding to the one lateral surface (e.g., the left lateral surface) and the second direction 102 may be a direction corresponding to the one lateral surface (e.g., the right lateral surface).

In an embodiment, the first rolling actuator 120 may be connected to at least a partial area of a first frame 210 (e.g., a front frame). According to an embodiment, the first rolling actuator 120 may be coupled to be fixed to at least a portion of the first frame 210. For example, the first rolling actuator 120 may be realized in a form such as a rod-shaped gear motor.

According to an embodiment, the first rolling actuator 120 may include a rotation gear 121 for forming a rotation shaft. In an embodiment, the rotation gear 121 may include multiple protrusions.

In an embodiment, a sliding housing 251 may cover a portion (e.g., a rear surface and/or a lateral surface) of the flexible display 110 to protect the display 110 from external impact or scratches.

According to an embodiment, a sliding rail 252 may be included in a partial area of the sliding housing 251. According to an embodiment, the sliding rail 252 may be engaged with the rotation gear 121 and convert rotation movement of the rotation gear 121 into linear movement.

In an embodiment, the sliding housing 251 may include the roller 220. According to an embodiment, the roller 220 may be connected to at least a partial area of the sliding housing 251.

According to an embodiment, the roller 220 may include a shaft 221 for forming a rotation shaft and coupled to be fixed to at least a portion of the sliding housing 251 through the shaft 221. According to an embodiment, the roller 220 may be realized in a form such as a cylindrical rod. According to an embodiment, the roller 220 may be engaged with the multi-plate 241. According to an embodiment, the roller 220 may include a gear structure having a protrusion. According to an embodiment, the roller 220 may rotate while being engaged with the multi-plate 241 through a protrusion included in the roller 220.

According to an embodiment, the multi-plate 241 may be realized in a form in which multiple plates are coupled. For example, the multiple plates may be arranged at predetermined intervals at a lower end of the flexible display 110.

In an embodiment, in response to an extension event of the flexible display 110, the first rolling actuator 120 may receive a voltage to operate.

According to an embodiment, the first rolling actuator 120 may rotate the rotation gear 121 to control the sliding housing 251 to linearly move forward (e.g., the first direction 101) and backward (e.g., the second direction 102). For example, the first rolling actuator 120 may rotate the rotation gear 121 in a first rotation direction (e.g., a clockwise direction based on the drawing) to control the sliding housing 251 to linearly move in a first linear direction (e.g., the first direction 101).

In an embodiment, in response to the linear movement of the sliding housing 251, the roller 220 fixed to an area of the sliding housing 251 may rotate. For example, in case the sliding housing 251 moves in the first linear direction, the roller 220 engaged with the multi-plate 142 may rotate in the first rotation direction (e.g., the clockwise direction based on the drawing).

In an embodiment, in response to the rotation movement of the roller 220, the multi-plate 142 engaged with the roller 220 may be rolled-up or rolled-down. For example, the roller 220 may rotate in the first rotational direction (e.g., the clockwise direction based on the drawing), and the multi-plate 142 may be unfolded while being rolled-up in the first rotational direction.

In an embodiment, in case the multi-plate 142 is rolled up, the flexible display 110 attached to an upper end of the first multi-plate 142 may be extended. According to an embodiment, in case the multi-plate 142 is rolled-down, the flexible display 110 may be inserted into the electronic device 100 to be contracted.

Hereinafter, for the convenience of the description, various embodiments will be described based on the structure of the electronic device 100 shown in FIG. 2A to FIG. 2C.

Figure 3:
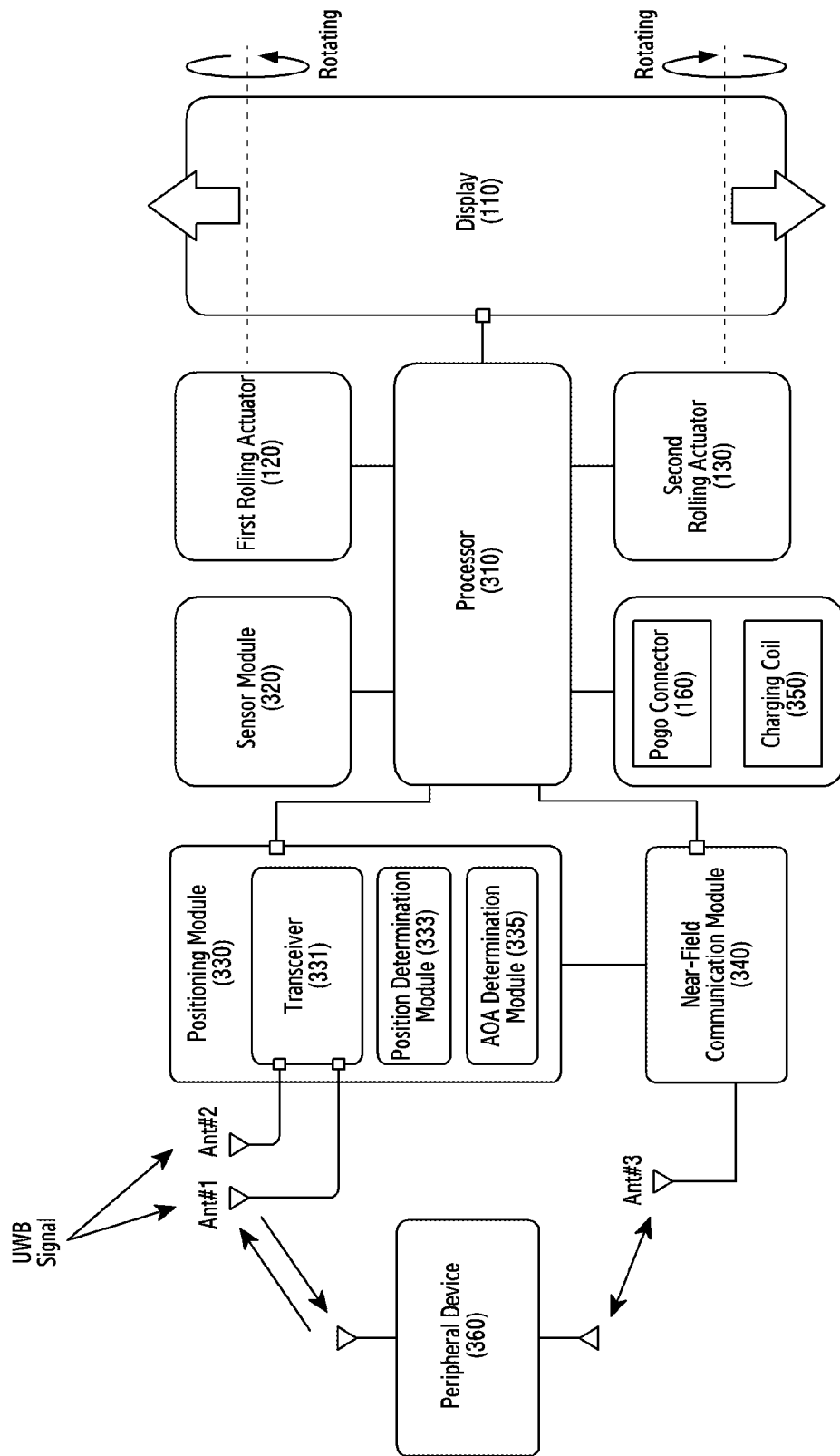
FIG. 3 is a block diagram illustrating an example configuration for main hardware and software of an electronic device according to various embodiments.

FIG. 3 is a block diagram illustrating an example configuration for main hardware and software of an electronic device 100 according to various embodiments.

Referring to FIG. 3, in an embodiment, the electronic device 100 may include a display 110, a first rolling actuator 120, a second actuator 130, a pogo connector module (e.g., including at least one pogo connector) 160, a processor (e.g., the processor 1120 in FIG. 11) (e.g., including processing circuitry) 310, a sensor module (e.g., including at least one sensor) 320, a positioning module (e.g., including various circuitry) 330, a near-field communication module (e.g., including near-field communication circuitry) 340, and/or a charging coil 350. According to an embodiment, the electronic device 100 may be electrically and/or operatively connected to a peripheral device 360 through wireless communication.

In an embodiment, the processor 310 may include various processing circuitry and drive the first rolling actuator 120 and/or the second rolling actuator 130 based on the sensor module 320, the positioning module 330, the near-field communication module 340, and the charging coil 350 to extend and/or contract the flexible display 110.

In an embodiment, the electronic device 100 may include multiple antennas arranged at predetermined intervals to transmit and/or receive a ranging message.

According to an embodiment, the electronic device 100 may control a rotation direction with respect to at least one of multiple rolling actuators based on direction information determined in response to the ranging signal. According to an embodiment, the electronic device 100 may determine, based on the ranging signal, whether a user using an electronic pen (e.g., the electronic pen 620 in FIG. 6) is left-handed or right-handed. According to an embodiment, the electronic device 100 may control a rotation direction of a rolling actuator in response to the determined dominant hand of the user. For example, in case the user is determined to be left-handed, the electronic device 100 may drive the first rolling actuator 120 to extend the flexible display 110 in the first direction 101. For another example, in case the user is determined to be right-handed, the electronic device 100 may drive the second rolling actuator 130 to extend the flexible display 110 in the second direction 102.

In an embodiment, the positioning module 330 may include a transceiver 331, a position determination module 333, an angle of arrival (AOA) determination module 335. According to an embodiment, the positioning module 330 may transmit a ranging request message (e.g., a poll message) to the peripheral device 360 through the transceiver 331. According to an embodiment, in response to the ranging request message, the peripheral device 360 may transmit a ranging response message (e.g., a response message) to the electronic device 100.

In an embodiment, the electronic device 100 may acquire distance information of the peripheral device 360 through the positioning module 330. For example, the positioning module 330 may determine how far the peripheral device 360 is from the electronic device 100 using a time difference between the ranging request message and the ranging response message.

According to an embodiment, the electronic device 100 may use a two way ranging (TWR) method to measure distance information. For example, the electronic device 100 may use a single side two way ranging (SS-TWR) method and/or a double side two way ranging (DS-TWR) method to measure distance information.

In an embodiment, the electronic device 100 may acquire direction information of the peripheral device 360 through the positioning module 330. According to an embodiment, direction information may be determined by receiving the same ranging response message from the peripheral device 360 through different antennas. For example, the electronic device 100 may measure an angle of arrival (AOA) through a signal phase difference with respect to the ranging response message received through different antennas.

According to an embodiment, relative direction information (e.g., an azimuth) of the peripheral device 360 may be determined using magnetic north direction information measured through a magnetic field sensor (e.g., the first magnetic field sensor 153 in FIG. 1A) in the electronic device 100. The electronic device 100 may determine a relative azimuth by +/−the angle of arrival to/from a first azimuth angle acquired from the magnetic field sensor.

In an embodiment, the near-field communication module 340 may include various near-field communication circuitry and perform wireless communication with the peripheral device 360 using an antenna. According to an embodiment, the wireless communication may include Bluetooth communication and WiFi.

According to an embodiment, the processor 310 may acquire information on the peripheral device 360 through the near-field communication module 340 to display the information on the flexible display 110 or perform remote control functions.

Figure 4:
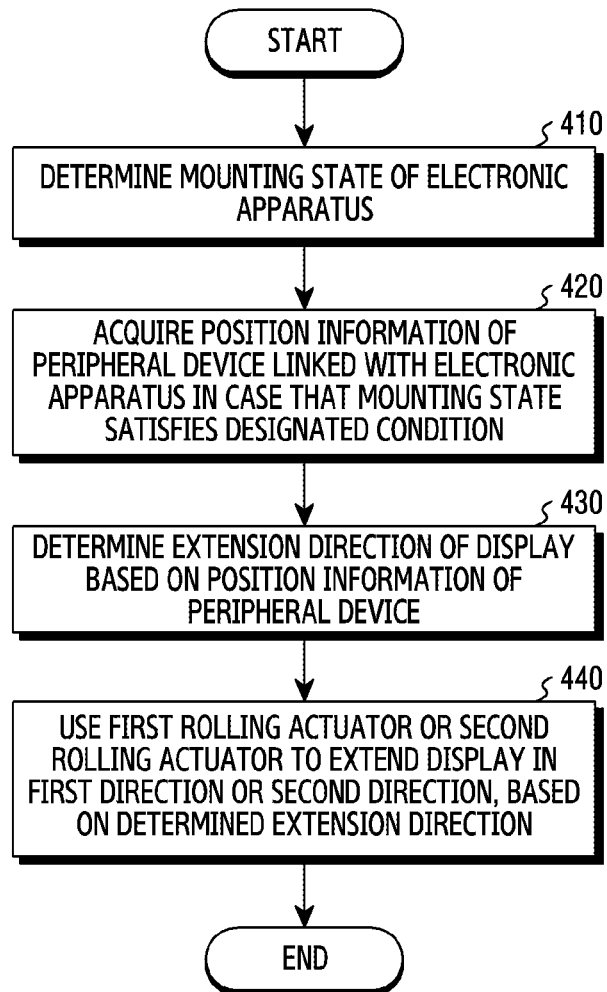
FIG. 4 is a flowchart illustrating an example process in which an extension direction of a flexible display is determined and the flexible display is extended in the determined direction in an electronic device according to various embodiments.

FIG. 4 is a flowchart illustrating an example process in which an extension direction of a flexible display 110 is determined and the flexible display 110 is extended in the determined direction in an electronic device 100 according to various embodiments.

In operation 410 according to an embodiment, a processor (e.g., 310 in FIG. 3) may determine a mounting state of the electronic device 100. According to an embodiment, the processor 310 may determine a mounting state of the electronic device 100 based on data acquired from the sensor module 320. According to an embodiment, the processor 310 may use an acceleration sensor to determine a mounting state of the electronic device 100.

For example, the processor 310 may acquire first motion data (x1, y1, z1) through a first acceleration sensor (e.g., 151 in FIG. 1) and acquire second motion data (x2, y2, z2) through a second acceleration sensor (e.g., 152 in FIG. 1) to identify a folding angle 150 between the electronic device 100 and the keyboard device 170. For example, the electronic device 100 may receive, through the pogo connector module 160, the second motion data (x2, y2, z2) acquired through the second acceleration sensor 152 included in the keyboard device 170 and identify a folding angle (e.g., 150 in FIG. 1) based on the first motion data (x1, y1, z1) and the second motion data (x2, y2, z2).

In an embodiment, the processor 310 may determine a mounting state of the electronic device 100 based on the identified folding angle 150.

For example, in case the processor 310 detects that the folding angle belongs to a first angle range (e.g., about 0° to about 10°), a mounting state of the electronic device 100 may correspond to a first close mode. For example, in case the processor 310 detects that the folding angle 150 belongs to a first angle range (e.g., about 10° to about 90°), a mounting state of the electronic device 100 may correspond to a first folding mode.

For example, in case the processor 310 detects that the folding angle 150 belongs to a second angle range (e.g., about 90° to about 180°), a mounting state of the electronic device 100 may correspond to a second mode (e.g., a standing mode).

For example, in case the processor 310 detects that the folding angle 150 belongs to a third angle range (e.g., about 180° to about 360°), a mounting state of the electronic device 100 may correspond to a third mode (e.g., a tablet mode).

In an embodiment, the processor 310 may determine a mounting state of the electronic device 100 based on a signal of a magnetic field sensor (e.g., the first magnetic field sensor 153 in FIG. 1A). In other words, the processor 310 may determine a mounting state of the electronic device 100 based on a signal of a magnetic field sensor (e.g., the first magnetic field sensor 153 in FIG. 1A) regardless of the folding angle between the electronic device 100 and the keyboard device 170.

According to an embodiment, the processor 310 may detect opening/closing of the electronic device 100 and the keyboard device 170 using at least one magnetic field sensor (e.g., a Hall sensor). For example, in case the processor 310 detects opening of the electronic device 100 and the keyboard device 170 using at least one magnetic field sensor (e.g., the first magnetic field sensor 153 in FIG. 1A), a mounting state of the electronic device 100 may correspond to a fourth mode (e.g., a close mode).

According to an embodiment, in case the processor 310 detects closing of the electronic device 100 and the keyboard device 170 using at least one magnetic field sensor, a mounting state of the electronic device 100 may correspond to a fifth mode (e.g., an open mode).

In operation 420 according to an embodiment, in case a mounting state of the electronic device 100 satisfies a designated condition, the processor 310 may acquire position information of the peripheral device 360 linked with the electronic device 100.

In an embodiment, the processor 310 may determine whether a mounting state of the electronic device 100 satisfies a designated condition. According to an embodiment, the designated condition may be a condition for the flexible display 110 to be extended. That is, the processor 310 in an embodiment may determine whether a mounting state of the electronic device 100 satisfies a condition for the flexible display 110 to be extended.

For example, in case a mounting state of the electronic device 100 corresponds to the second mode (e.g., the standing mode) or the fifth mode (e.g., the open mode), the processor 310 may determine that a condition for the flexible display 110 to be extended is satisfied.

In an embodiment, the processor 310 may acquire position information of the peripheral device 360 linked to the electronic device 100 at least using wireless communication. According to an embodiment, the processor 310 may additionally acquire direction information and angle information by at least using wireless communication in addition to the position information of the peripheral device 360.

According to an embodiment, the processor 310 may acquire direction information and angle information of the peripheral device 360 based on azimuth, pitch, and roll values of the peripheral device 360 acquired from at least one sensor.

In operation 430 according to an embodiment, the processor 310 may determine an extension direction of the flexible display 110 based on the position information of the peripheral device 360. For example, in case the peripheral device 360 is positioned in a right direction of the electronic device 100, the processor 310 may determine an extension direction of the flexible display 110 as the second direction 102 corresponding to the right direction.

In an embodiment, the processor 310 may determine an extension direction of the flexible display 110 based on the position information and the angle information of the peripheral device 360. In other words, the processor 310 may conjecture whether a user is right-handed or left-handed through the angle information of the peripheral device 360 and determine an extension direction of the flexible display 110 based thereon. For example, in case the peripheral device (e.g., the electronic pen 620 in FIG. 6) 360 is positioned in the right direction of the electronic device 100 and one end (e.g., a cap part of the electronic pen) of the peripheral device 360 faces the right direction, the processor 310 may determine the extension direction of the flexible display 110 as the second direction 102 corresponding to the right direction.

However, the extension direction is not limited to the right direction. For example, in case the peripheral device (e.g., the electronic pen 620 in FIG. 6) 360 is positioned in the left direction of the electronic device 100 and one end (e.g., a cap part of the electronic pen) of the peripheral device 360 faces the left direction, the processor 310 may determine the extension direction of the flexible display 110 as the first direction 101 corresponding to the left direction.

In operation 440 according to an embodiment, based on the determined extension direction, the processor 310 may use the first rolling actuator 120 or the second rolling actuator 130 to extend the flexible display 110 in the first direction 101 or the second direction 102. For example, in case the peripheral device 360 is positioned in the first direction 101 of the electronic device 100, the processor 310 may determine to extend the flexible display 110 in the first direction 101 based on the position information. According to an embodiment, in case the processor 310 determines to extend the flexible display 110 in the first direction 101 based on the position information, the electronic device 100 may drive the first rolling actuator 120 to extend the flexible display 110 in the first direction 101.

In an embodiment, the processor 310 may display an interface related to the peripheral device 360 on an extended area of the flexible display 110. For example, in case the peripheral device 360 corresponds to an electronic pen (e.g., the electronic pen 620 in FIG. 6), a drawing board application may be executed through a second area 112 and/or a third area 113 extended. For another example, in case the peripheral device 360 corresponds to an external device (e.g., the external device 810 in FIG. 8), a function such as screen sharing and/or remote control may be executed through the second area 112 and/or the third area 113.

In an embodiment, the processor 310 may execute a first application (e.g., a video application) by including an extended area of the flexible display 110. For example, in case a video is executed at a ratio of 16:9 through a first area 111 of the flexible display 110 before the extension, the processor 310 may execute the video at a ratio of 21:9 through the second area 112 and/or the third area 113 including the first area 111 after the extension.

Figure 5:
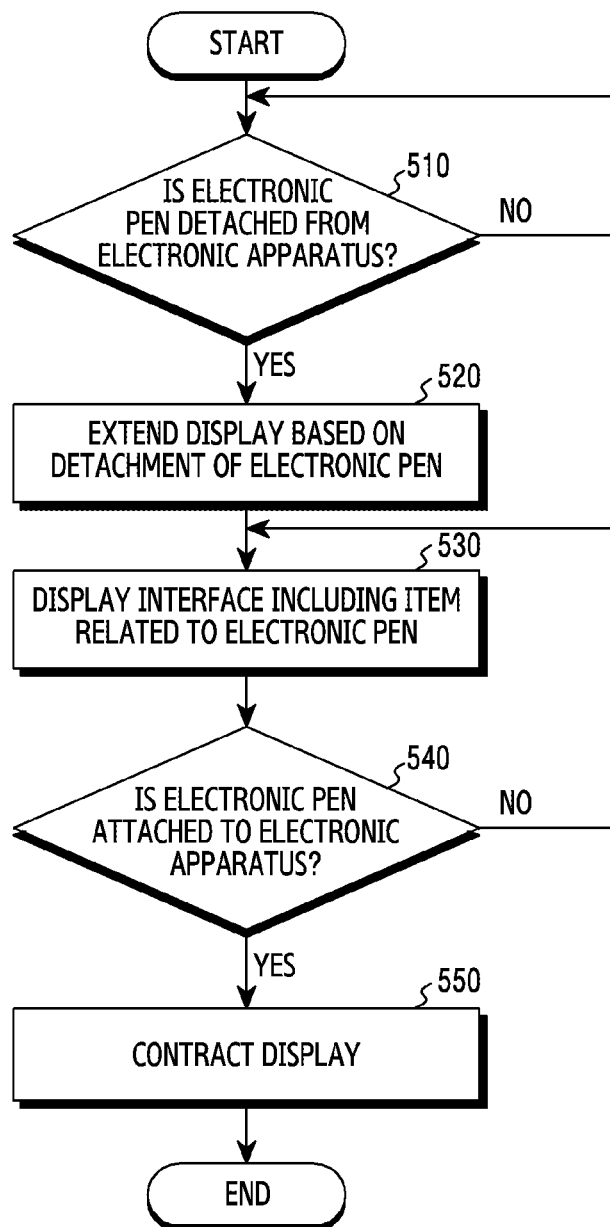
FIG. 5 is a flowchart illustrating an example process of extending or contracting a flexible display based on attachment/detachment of an electronic pen in an electronic device according to various embodiments.

FIG. 5 is a flowchart illustrating an example process of extending or contracting a flexible display 110 based on attachment/detachment of an electronic pen 620 (refer to FIG. 6) in an electronic device 100 according to various embodiments.

In operation 510 according to an embodiment, the processor 310 may determine whether the electronic pen 620 is detached from the electronic device 100. According to an embodiment, the electronic pen 620 may maintain a state of being attached to a surface of the electronic device 100 by a third magnet 621 and/or a fourth magnet 623 disposed on a surface of the electronic device 100. According to an embodiment, the electronic pen 620 in an attached state may be detached by an external force (e.g., a user's force).

In an embodiment, the processor 310 may determine whether the electronic pen 620 is detached from the electronic device 100, based on a signal acquired through the charging coil 350. For example, in case a charging off signal of the electronic pen 620 received through the charging coil 350 is detected, the processor 310 may determine that the electronic pen 620 is detached from the electronic device 100. According to an embodiment, in case the processor 310 determines that the electronic pen 620 is detached from the electronic device 100, operation 520 may be performed. According to an embodiment, in case the processor 310 determines that the electronic pen 620 is not detached from the electronic device 100, operation 510 may be performed.

In operation 520 according to an embodiment, the processor 310 may extend the flexible display 110 based on the detachment of the electronic pen 620 (yes in operation 510).

In an embodiment, in case the electronic pen 620 is detached, the processor 310 may selectively extend the flexible display 110. According to an embodiment, in response to the detachment of the electronic pen 620, the processor 310 may extend the flexible display 110 in the first direction 101, extend the flexible display 110 in the second direction 102, or extend the flexible display 110 in the first direction 101 and the second direction 102.

In an embodiment, the processor 310 may acquire position information of the electronic pen 620 using at least one sensor to determine an extension direction of the flexible display 110. According to an embodiment, in response to the detachment of the electronic pen 620, the processor 310 may acquire position information of the electronic pen and based thereon, determine an extension direction of the flexible display 110. For example, in case the electronic pen 620 is positioned on the right side with reference to the electronic device 100 after detachment, the second rolling actuator 130 corresponding to the right side is driven to extend the flexible display 110 based on the position information.

In an embodiment, the processor 310 may acquire angle information of the electronic pen 620 using at least one sensor to determine an extension direction of the flexible display 110. According to an embodiment, in response to the detachment of the electronic pen 620, the processor 310 may determine whether a user is right-handed or left-handed according to an angle of the electronic pen 620 to determine an extension direction of the flexible display 110. For example, in case one end (e.g., a cap part of the electronic pen) of the electronic pen 620 faces a right side after the electronic pen 620 is detached, the user may be determined to be right-handed and the second rolling actuator 130 corresponding to the right side is driven to extend the flexible display 110.

In an embodiment, in order to determine an extension direction of the flexible display 110, the processor 310 may display a user interface inquiring an extension direction of the flexible display 110 on one area of the flexible display 110 in response to the detachment of the electronic pen 620. According to an embodiment, the processor 310 may acquire a user's input with respect to a user interface regarding the extension direction.

According to an embodiment, the processor 310 may extend the flexible display 110 in a direction corresponding to the user input. For example, in response to a detachment signal of the electronic pen 620, the processor 310 may display an interface inquiring an extension direction on one area of the flexible display 110, and in case a user input indicating extension in the right direction is acquired through the interface, drive the second rolling actuator 130 to extend the flexible display 110.

In operation 530 according to an embodiment, the processor 310 may display an interface including a content regarding the electronic pen 620. According to an embodiment, the processor 310 may display a content 631 regarding a pen tool on one surface of the flexible display 110. For example, the processor 310 may display a content 631 regarding a pen tool such as a pen type and a pen color.

In operation 540 according to an embodiment, the processor 310 may determine whether the electronic pen 620 is attached to the electronic device 100. In a detached state, the electronic pen 620 may be attached to a surface of the electronic device 100 by the third magnet 621 and/or the fourth magnet 623. According to an embodiment, the processor 310 may determine whether the electronic pen 620 is attached to the electronic device 100, based on a signal acquired through the charging coil 350. For example, in case the processor 310 detects a charging on signal of the electronic pen 620 received through the charging coil 350, the electronic device 100 may determine that the electronic pen 620 is attached to the electronic device 100. According to an embodiment, in case the processor 310 determines that the electronic pen 620 is attached to the electronic device 100, operation 550 may be performed.

Furthermore, according to an embodiment, in case the processor 310 determines that the electronic pen 620 is not attached to the electronic device 100, operation 530 may be performed.

In operation 550 according to an embodiment, in case the processor 310 detects that the electronic pen 620 is attached to the electronic device 100 (yes in operation 540), the electronic device 100 may contract the flexible display 110. According to an embodiment, in response to contraction of the flexible display 110, the processor 310 may remove display of an interface including a content regarding the electronic pen 620 displayed on an area of the flexible display 110.

Figure 6A:
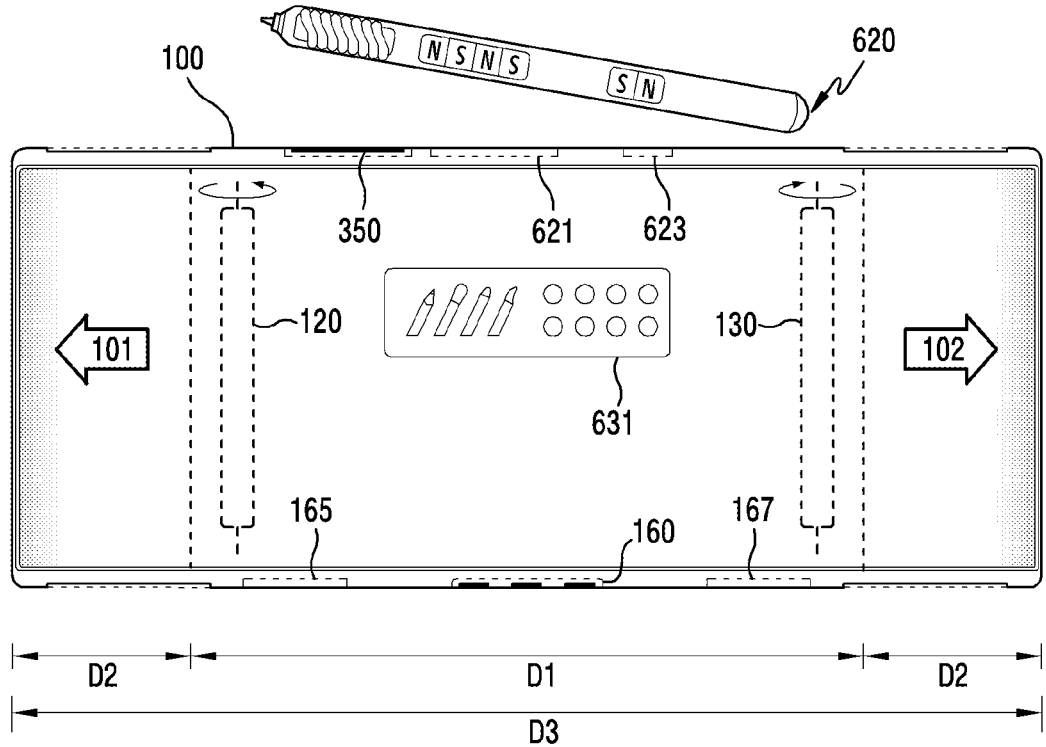
FIG. 6A is a diagram illustrating a flexible display which is extended in case an electronic pen is detached from an electronic device according to various embodiments.
Figure 6B:
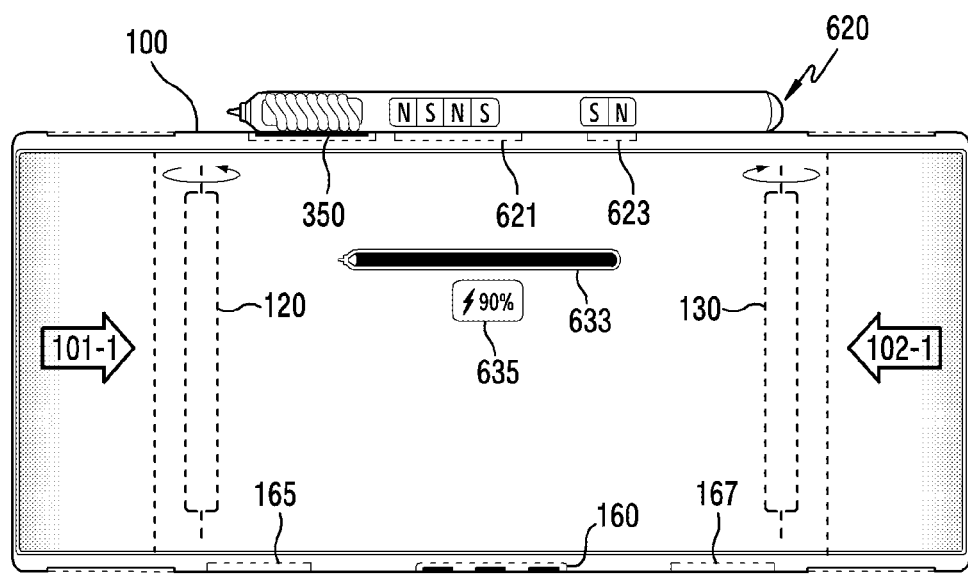
FIG. 6B is a diagram illustrating a flexible display which is contracted in case an electronic pen is attached to an electronic device according to various embodiments.

FIG. 6A is a diagram illustrating a flexible display 110 which is extended in case an electronic pen 620 is detached from an electronic device 100 according to various embodiments. FIG. 6B is a diagram illustrating a flexible display 110 which is contracted in case an electronic pen 620 is attached to an electronic device 100 according to various embodiments.

Referring to FIG. 6A and FIG. 6B, the electronic device 100 may include the third magnet 621 and/or the fourth magnet 623 for attaching the electronic pen 620 to one lateral surface thereof. In an embodiment, the electronic pen 620 may include at least one magnet disposed therein and, in this case, a magnetic force (e.g., magnetic attraction) may work between the magnet disposed in the electronic pen 620 and the magnet disposed in the electronic device 100 so that the electronic pen 620 may be fixed to the electronic device 100.

Referring to FIG. 6A, in case the electronic pen 620 is detached from the electronic device 100, the processor 310 may drive the first rolling actuator 120 and the second rolling actuator 130 to extend the flexible display 110. According to an embodiment, in response to the extension of the flexible display 110, the processor 310 may display a content 631 regarding a pen tool on one surface of the flexible display 110. For example, the processor 310 may display a content 631 regarding a pen tool such as a pen type and a pen color.

Referring to FIG. 6B, in case the electronic pen 620 is attached to the electronic device 100, the processor 310 may drive the first rolling actuator 120 and/or the second rolling actuator 130 to contract the flexible display 110. For example, in response to contraction of the flexible display 110, the processor 310 may display a content 633 indicating that the electronic pen 620 is attached to a surface of the flexible display 110 and a content 635 indicating a battery level of the electronic pen 620.

Figure 7:
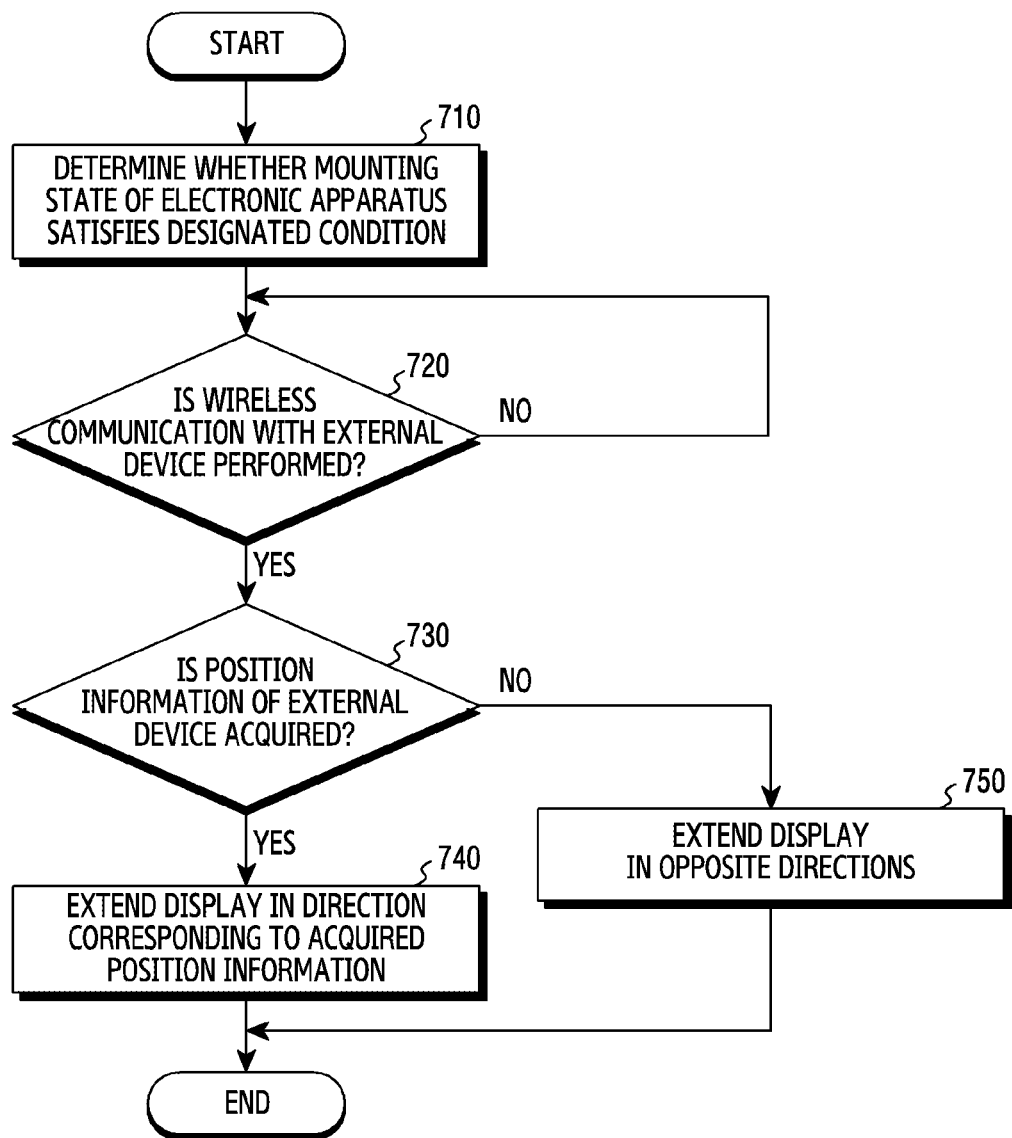
FIG. 7 is a flowchart illustrating an example process of extending a flexible display in case of performing wireless communication with an external device in an electronic device according to various embodiments.

FIG. 7 is a flowchart illustrating an example process of extending a flexible display 110 in case of performing wireless communication with an external device 810 (refer to FIG. 8) in an electronic device 100 according to various embodiments.

In operation 710 according to an embodiment, the processor 310 may determine whether a mounting state of the electronic device 100 satisfies a designated condition. According to an embodiment, operation 710 may correspond to the process of determining whether a mounting state of the electronic device 100 satisfies a designated condition in operation 420 of FIG. 4.

In operation 720 according to an embodiment, the processor 310 may determine whether wireless communication is performed with the external device 810.

In an embodiment, the processor 310 may perform wireless communication (e.g., the first communication 820 in FIG. 8) for a function of sharing screen (e.g., a DEX mode or a mirroring mode) with the external device 810. For example, the processor 310 may display, on the second area 112 and/or the third area 113 of the flexible display 110, a user interface regarding a message displayed on a screen of the external device 810.

In an embodiment, the processor 310 may perform a function (e.g., connection with window) through the second area 112 and/or the third area 113 of the flexible display 110. The processor 310 may control the external device 810 connected to the electronic device 100 through the function (e.g., connection with window). For example, the processor 310 may display various applications of the external device 810, such as a message or album, on the second area 112 and/or the third area 113 of the flexible display 110 and perform a function (e.g., message transmission) corresponding to a user's input.

According to an embodiment, in case the processor 310 determines that the electronic device 100 performs wireless communication with the external device 810, operation 730 may be performed, and in case the processor 310 determines that the electronic device 100 does not perform wireless communication with the external device 810, operation 720 may be performed.

In operation 730 according to an embodiment, the processor 310 may determine whether position information of the external device 810 is acquired. The processor 310 may acquire at least one piece of position information, angle information, and direction information of the external device 810.

According to an embodiment, in case the processor 310 acquires position information of the external device 810 through at least one sensor, operation 740 may be performed, and in case the processor 310 does not acquire position information of the external device 810, operation 750 may be performed.

In operation 740 according to an embodiment, the processor 310 may extend the flexible display 110 in a direction corresponding to the acquired position information (yes in operation 730). According to an embodiment, in case of acquiring position information of the external device 810 in a state of performing wireless communication with the external device 810, the processor 310 may extend the flexible display 110 in a direction corresponding to the acquired position information. For example, in response to position information of the external device 810 positioned on the right side with reference to the center of the flexible display 110, the processor 310 may drive the second rolling actuator 130 to extend the flexible display 110 in the second direction 102.

In an embodiment, in case of acquiring position information, angle information, and direction information of the external device 810 in a state of performing wireless communication with the external device 810, the processor 310 may extend the flexible display 110 based on the acquired position information, angle information, and direction information. For example, in case the external device 810 is positioned on the right side with reference to the electronic device 100 and the external device 810 is leaned to the right side, the processor 310 may determine that a user is right-handed. According to an embodiment, based on the determination, the processor 310 may extend the flexible display 110 in the right direction.

In an embodiment, in case of acquiring position information of the external device 810 in a state of performing wireless communication with the external device 810, the processor 310 may drive the first rolling actuator 120 and the second rolling actuator 130 to extend the flexible display 110 in the first direction 101 and the second direction 102.

In operation 750 according to an embodiment, the processor 310 may extend the flexible display 110 in opposite directions (no in operation 730). According to an embodiment, in case of failing to acquire position information of the external device 810 in a state of performing wireless communication with the external device 810, the processor 310 may drive the first rolling actuator 120 and the second rolling actuator 130 to extend the flexible display 110 in the first direction 101 and the second direction 102.

Figure 8:
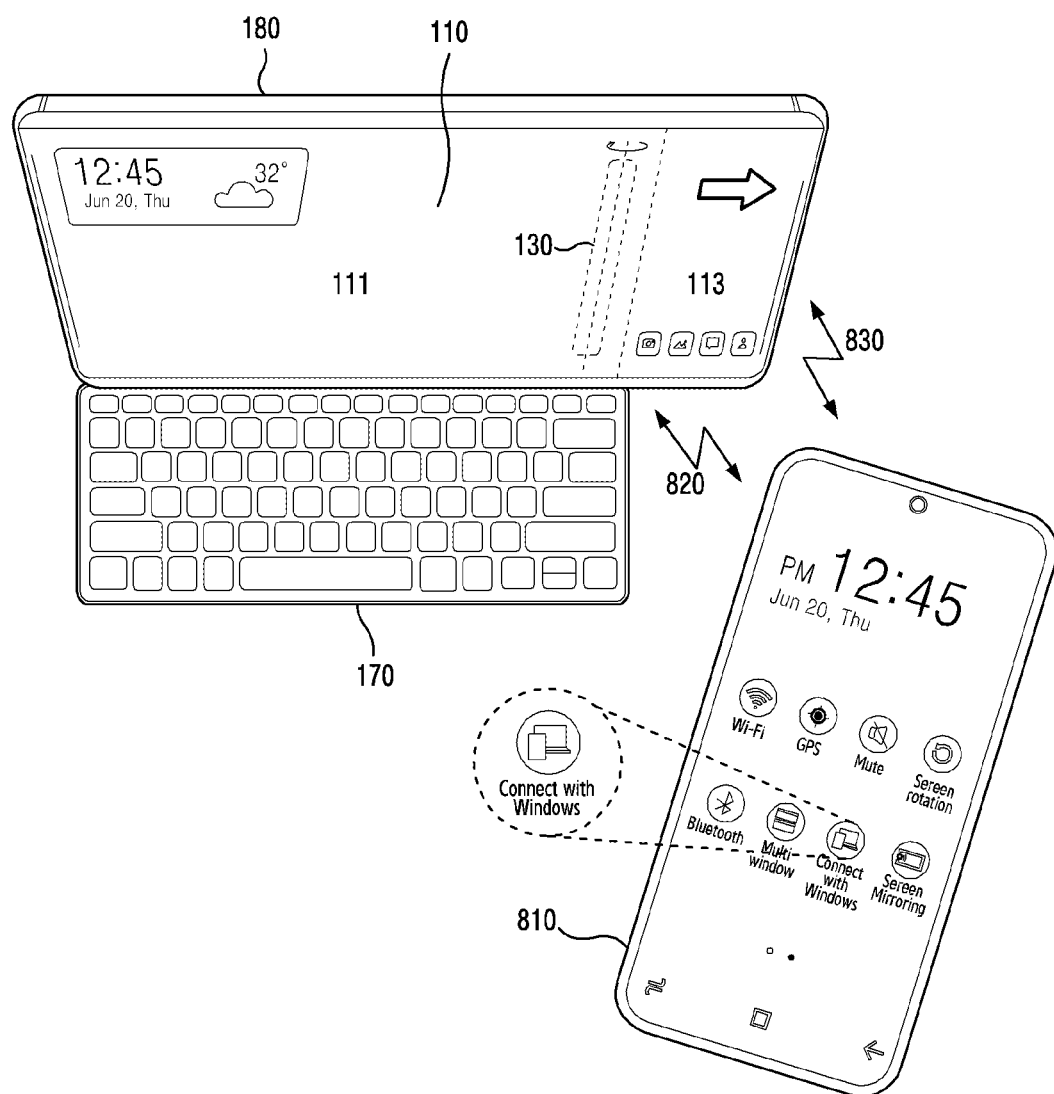
FIG. 8 is a diagram illustrating a flexible display extended in case an electronic device performs wireless communication with an external device according to various embodiments.

FIG. 8 is a diagram illustrating a flexible display 110 to be extended in case an electronic device 100 performs wireless communication with an external device 810 according to various embodiments.

Referring to FIG. 8, in an embodiment, the electronic device 100 may perform first communication 820 and/or second communication 830 with the external device 810. According to an embodiment, the processor 310 may perform screen sharing and/or remote-control function through the first communication 820. For example, the processor 310 may perform a first operation (e.g., connection to windows) and a second operation (e.g., a DEX mode or a mirroring mode) through the first communication 820. According to an embodiment, the processor 310 may transmit and/or receive at least one piece of the position information, the angle information, and the direction information of the external device 810 through the second communication (e.g., UWB communication) 830.

In an embodiment, in case of performing the first communication 820 and the second communication 830, the processor 310 may drive at least one rolling actuator to extend the flexible display 110. For example, the processor 310 may try screen sharing with the external device 810 through the first communication 820, and in case a position of the external device 810 is on the right side with reference to the electronic device 100, may drive the second rolling actuator 130 corresponding to the right direction to extend the flexible display 110 in the right direction.

For another example, the processor 310 may try remote control of the external device 810 through the first communication 820, and may drive the second rolling actuator 130 corresponding to the right side so as to extend the flexible display 110 in the right direction based on angle information indicating inclination of the external device 810 to the right side.

Figure 9:
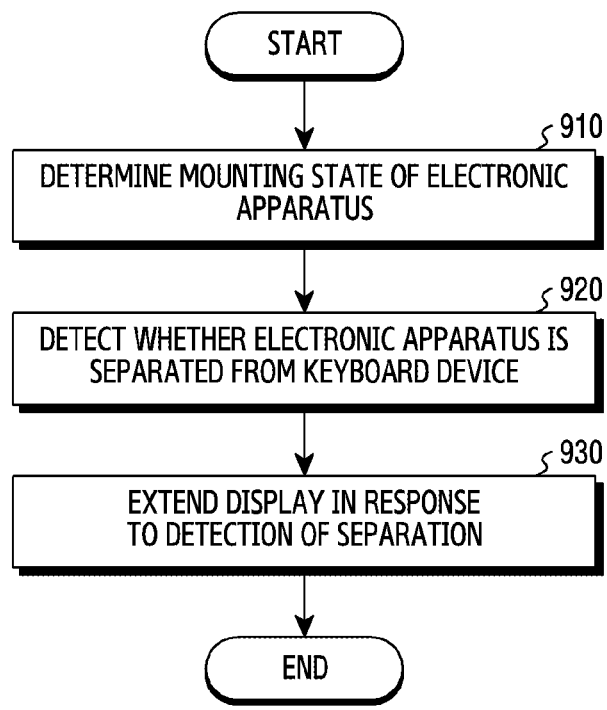
FIG. 9 is a flowchart illustrating an example process of extending a flexible display in case of detecting that an electronic device is separated from a keyboard device according to various embodiments.

FIG. 9 is a flowchart illustrating an example process of extending a flexible display 110 in case of detecting that an electronic device 100 is separated from a keyboard device 170 according to various embodiments.

In operation 910 according to an embodiment, a processor 310 may determine a mounting state of the electronic device 100. Operation 910 may correspond to operation 410 in FIG. 4.

In operation 920 according to an embodiment, a processor 310 may detect whether the electronic device 100 is separated from the keyboard device 170. According to an embodiment, in order to detect separation of the electronic device 100 from the keyboard device 170, the processor 310 may acquire motion data from the first acceleration sensor 151 and the first magnetic field sensor 153 and acquire motion data from a second magnetic field sensor 1010 included in the keyboard device 170.

According to an embodiment, based on the motion data acquired from the first acceleration sensor 151 and the first magnetic field sensor 153 and the motion data acquired from the second magnetic field sensor 1010, the processor 310 may detect that the electronic device 100 is separated from the keyboard device 170. For example, in case the electronic device 100 is separated from the keyboard device 170, the processor 310 may detect a voltage change through the first magnetic field sensor 153 and the second magnetic sensor 1010 and detect a separated and floated state through the voltage change.

According to an embodiment, in the floated state, the electronic device 100 may be referred to as being in a floating mode.

In an embodiment, the processor 310 may detect a direction in which the electronic device 100 is separated.

According to an embodiment, the processor 310 may detect, through the first acceleration sensor 151, that the electronic device 100 moves in a direction perpendicular to the keyboard device 170. For example, the processor 310 may analyze the first motion data (x1, y1, z1) acquired through the first acceleration sensor 151 and the second motion data (x2, y2, z2) acquired through the second acceleration sensor 152 to detect that the electronic device 100 moves in a direction perpendicular to the keyboard device 170.

In operation 930 according to an embodiment, in response to detecting that the electronic device 100 is separated from the keyboard device 170, a processor 310 may extend the flexible display 110. For example, the processor 310 may block controlling of a rolling actuator in the second mode (e.g., the standing mode) and control the rolling actuator in the floating mode to extend the flexible display 110.

Figure 10:
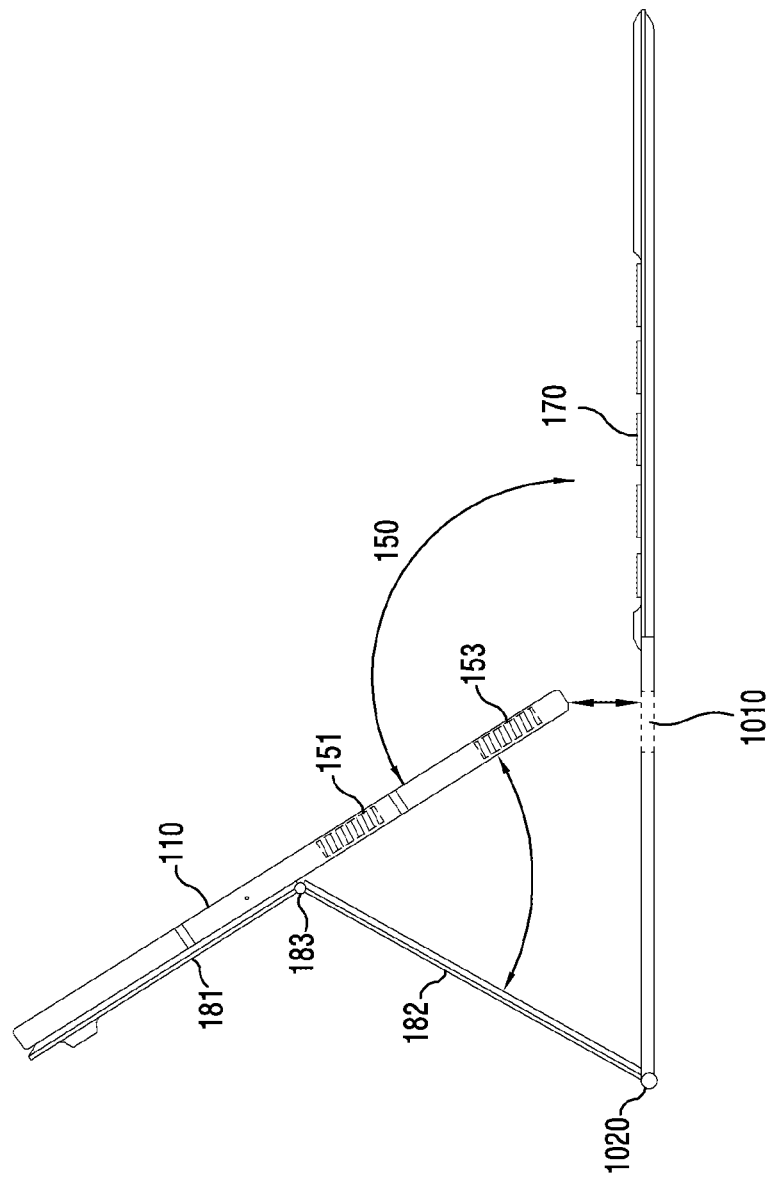
FIG. 10 is a diagram illustrating a mounting state in which an electronic device is floated by a first distance from a keyboard device according to various embodiments.

FIG. 10 is a diagram illustrating a state in which a mounting state of an electronic device 100 is floated by a first distance from a keyboard device 170 according to various embodiments. FIG. 10 may illustrate a state additionally including a support hinge 1020 and the second magnetic field sensor 1010 to FIG. 1C. FIG. 10 is a view illustrating an embodiment related to FIG. 9.

Referring to FIG. 10, the keyboard device 170 and the cover 180 may be physically connected to each other. For example, one end of the second cover area 182 and one end of the keyboard device 170 may be connected to each other.

According to an embodiment, the keyboard device 170 and the cover 180 may be connected to each other while maintaining a predetermined angle therebetween through the support hinge 1020.

In an embodiment, the electronic device 100 may be in a floating mode in which the electronic device 100 is floated by a first distance in a first separation direction from the keyboard device 170.

According to an embodiment, the electronic device 100 may be in the floating mode by an external force (e.g., a user's force).

According to an embodiment, the electronic device 100 may display a user interface with respect to mode selection through the flexible display 110 and may be converted into the floating mode in response to the user input to the interface.

According to an embodiment, in case of detecting the floating mode in which the electronic device 100 is floated from the keyboard device 170, the processor 310 may drive the first rolling actuator 120 and/or the second rolling actuator 130 to extend the flexible display 110.

In an embodiment, in case the electronic device 100 is attached to the keyboard device 170 in the floating mode, the processor 310 may drive the first rolling actuator 120 and/or the second rolling actuator 130 to contract the display 110.

Figure 11:
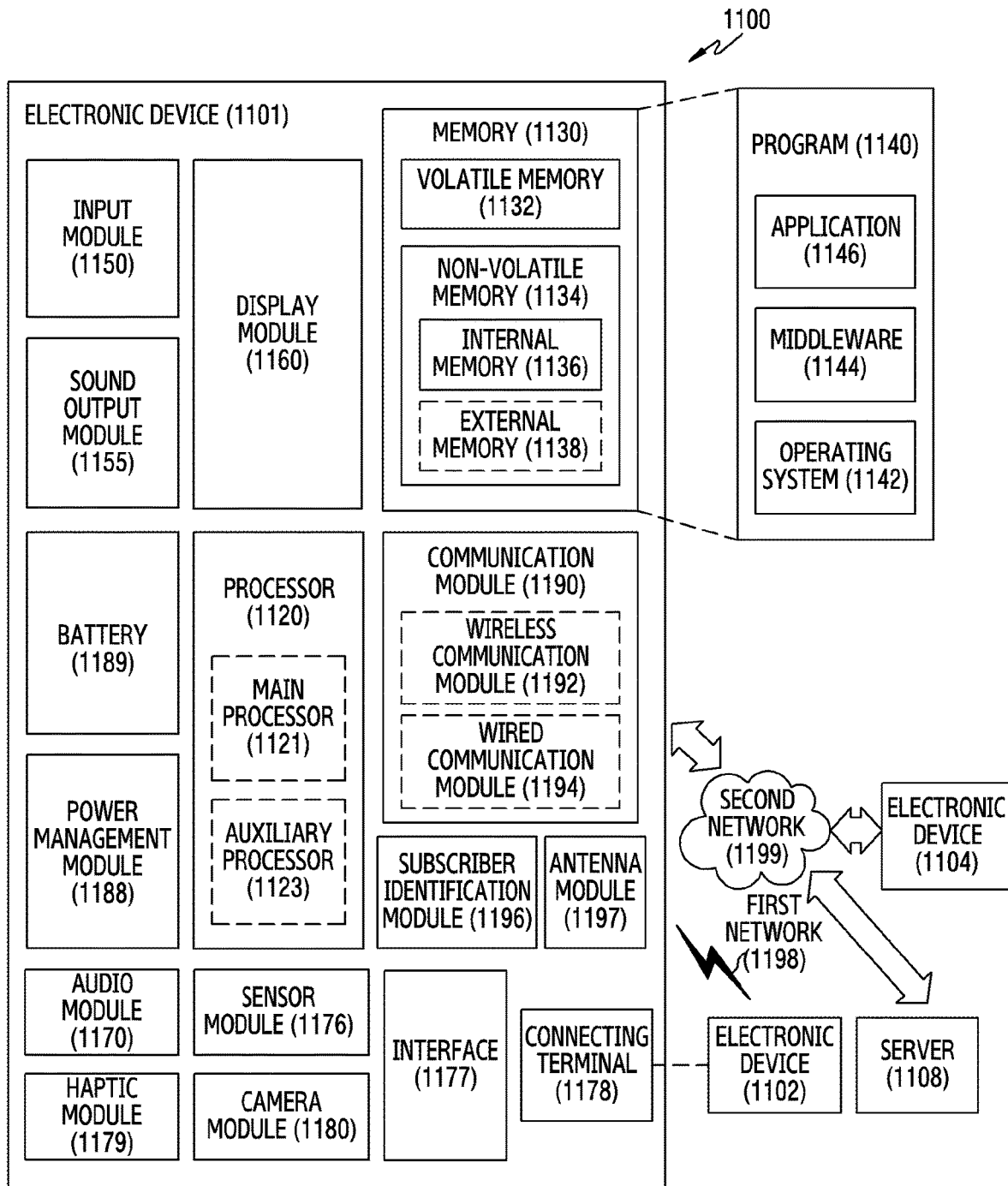
FIG. 11 is a block diagram illustrating an example electronic device in a network environment according to various embodiments.

FIG. 11 is a block diagram illustrating an example electronic device 1101 (e.g., the electronic device 100 in FIG. 1A) in a network environment 1100 according to various embodiments.

Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108.

According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In various embodiments, at least one of the components (e.g., the connecting terminal 1178) may be omitted from the electronic device 1101, or one or more other components may be added in the electronic device 1101. In various embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to an embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to an embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™ wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. According to an embodiment, the antenna module 1197 may include an antenna 5 including a radiating element including a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In an embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with,"

"coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In various embodiments, an electronic device 100 may include a flexible display 110, a first rolling actuator 120 configured to extend the flexible display 110 in a first direction 101, a second rolling actuator 130 configured to extend the flexible display 110 in a second direction 102 opposite to the first direction 101, and at least one processor (e.g., the processor 310 in FIG. 3) electrically connected to the flexible display 110, the first rolling actuator 120, and the second rolling actuator 130.

In an embodiment, the processor 310 may determine a mounting state of the electronic device 100. In case the mounting state satisfies a designated condition, the processor 310 may acquire position information of a peripheral device linked with the electronic device 100. The processor 310 may determine an extension direction of the flexible display 110 based on the position information of the peripheral device. Based on the determined extension direction, the processor 310 may use the first rolling actuator 120 or the second rolling actuator 130 to extend the flexible display 110 in the first direction 101 or the second direction 102.

In an embodiment, the processor 310 may determine a folding angle between the electronic device and a keyboard device operatively connected to the electronic device using at least one acceleration sensor. In case the folding angle belongs to a first angle range, the processor 310 may determine that the mounting state of the electronic device 100 satisfies the designated condition.

In an embodiment, the processor 310 may display an interface related to the peripheral device through a first area of the flexible display 110 extended in the first direction 101 to be exposed or a second area of the flexible display 110 extended in the second direction 102 to be exposed.

In an embodiment, in case the position of the peripheral device is in a first lateral direction with reference to the electronic device 100, the processor 310 may drive the first rolling actuator 120 to extend the flexible display 110 in the first direction 101 corresponding to the first lateral direction. In case the position of the peripheral device is in a second lateral direction with reference to the electronic device 100, the processor 310 may drive the second rolling actuator 130 to extend the flexible display 110 in the second direction 102 corresponding to the second lateral direction.

In an embodiment, the processor 310 may detect an attachment/detachment signal of an electronic pen (e.g., the electronic pen 620 in FIG. 6A) operatively connected to the electronic device 100. In response to a detachment signal indicating that the electronic pen 620 is detached from the electronic device 100, the processor 310 may extend the flexible display 110. In response to an attachment signal indicating that the electronic pen 620 is attached to the electronic device 100, the processor 310 may contract the flexible display 110.

In an embodiment, the processor 310 may determine an extension direction of the flexible display 110 based on at least one of position information, direction information, or angle information of the electronic pen 620.

In an embodiment, in case the electronic pen 620 is detached from the electronic device 100, the processor 310 may display a content related to the electronic pen 620 on an area of the flexible display 110. The content related to the electronic pen may include at least one of a pen color or a pen thickness.

In an embodiment, the peripheral device may be a portable terminal operatively connected to the electronic device 100. The processor 310 may perform wireless communication with the portable terminal. In response to performing of the wireless communication, the processor 310 may drive at least one of the first rolling actuator 120 or the second rolling actuator 130 to extend the flexible display 110.

In an embodiment, the processor 310 may acquire a signal of a keyboard device (e.g., the keyboard device 170 in FIG. 1A) operatively connected to the electronic device 100. The processor 310 may detect a floating mode in which the electronic device 100 is floated from the keyboard device 170 by a first distance or more, using at least one magnetic field sensor. In response to the floating mode, the processor 310 may use the first rolling actuator 120 or the second rolling actuator 130 to extend the flexible display 110 in the first direction 101 or the second direction 102.

In an embodiment, the processor 310 may extend the flexible display 110 by a first length. In response to a user input in a state in which the flexible display 110 is extended by the first length, the processor 310 may extend the flexible display 110 by a second length longer than the first length.

In various embodiments, an operation method of an electronic device 100 may include determining a mounting state of the electronic device 100, an operation of acquiring, in case the mounting state satisfies a designated condition, position information of a peripheral device linked with the electronic device 100, determining an extension direction of a flexible display 110 based on the information about the position of the peripheral device, and using a first rolling actuator 120 or a second rolling actuator 130 to extend the flexible display 110 in a first direction 101 or a second direction 102 opposite to the first direction based on the determined extension direction.

In an embodiment, the operation method of the electronic device 100 may include determining a folding angle between the electronic device 100 and a keyboard device 170 operatively connected to the electronic device 100 using at least one acceleration sensor and in case the folding angle belongs to a first angle range, determining that a mounting state of the electronic device 100 satisfies the designated condition.

In an embodiment, the operation method of the electronic device 100 may include detecting an attachment/detachment signal of an electronic pen 620 operatively connected to the electronic device 100, extending the flexible display 110 in response to a detachment signal indicating that the electronic pen 620 is detached from the electronic device 100, and contracting the flexible display 110 in response to an attachment signal indicating that the electronic pen 620 is attached to the electronic device 100.

In an embodiment, the operation method of the electronic device 100 may include, in case the position of the peripheral device is in a first lateral direction with reference to the electronic device 100, driving the first rolling actuator 120 to extend the flexible display 110 in the first direction 101 corresponding to the first lateral direction, and in case the position of the peripheral device is in a second lateral direction with reference to the electronic device, driving the second rolling actuator 130 to extend the flexible display 110 in the second direction 102 corresponding to the second lateral direction.

In an embodiment, the peripheral device may be a mobile terminal operatively connected to the electronic device 100, and the operation method of the electronic device 100 may include performing wireless communication with the mobile terminal and in response to performing of the wireless communication, an operation of driving at least one of the first rolling actuator 120 or the second rolling actuator 130 to extend the flexible display 110.

In various embodiments, an electronic device 100 may include a flexible display 110, at least one rolling actuator (e.g., the first rolling actuator 120 or the second rolling actuator 130 in FIG. 1A) configured to extend the flexible display 110, and at least one processor (e.g., the processor 310 in FIG. 3) electrically connected to the flexible display 110 and the at least one rolling actuator.

In an embodiment, the processor 310 may determine a mounting state of the electronic device 100. In case the mounting state satisfies a designated condition, the processor 310 may detect an extension event of the flexible display 110. The processor 310 may determine an extension direction of the flexible display 110 based on the extension event. The processor 310 may use the at least one rolling actuator to extend the flexible display 110 based on the determined extension direction.

In an embodiment, the processor 310 may execute a first application on a basic area of the flexible display 110 and execute a second application different from the first application on an extended area of the flexible display 110 extended to be exposed.

In an embodiment, the processor 310 may acquire position information and direction information of a peripheral device operatively connected to the electronic device 100 through at least one sensor. The processor 310 may determine an extension direction of the flexible display 110 based on the acquired position information and direction information. The processor 310 may use the at least one rolling actuator to extend the flexible display 110 corresponding to the determined extension direction.

In an embodiment, the processor 310 may detect an attachment/detachment signal of an electronic pen 620 operatively connected to the electronic device 100. In response to a detachment signal indicating that the electronic pen 620 is detached from the electronic device 100, the processor 310 may extend the flexible display 110. The processor 310 may display an interface related to the electronic pen 620 on an extended area of the flexible display 110. In response to an attachment signal indicating that the electronic pen 620 is attached to the electronic device 100, the processor 310 may contract the flexible display 110.

In an embodiment, the processor 310 may acquire a signal of a keyboard device 170 operatively connected to the electronic device 100. The processor 310 may detect a floating mode in which the electronic device 100 is spaced a first distance or more from the keyboard device 170, using at least one magnetic field sensor. In response to the floating mode, the processor 310 may use the at least one rolling actuator to extend the flexible display 110 in a first direction 101 or a second direction 102 opposite to the first direction 101. In case the floating mode is released, the processor 310 may contract the flexible display 110.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a flexible display;
   a first rolling actuator configured to extend the flexible display in a first direction;
   a second rolling actuator configured to extend the flexible display in a second direction opposite to the first direction; and
   at least one processor electrically connected to the flexible display, the first rolling actuator, and the second rolling actuator,
   wherein the at least one processor is configured to:
   determine a mounting state of the electronic device;
   based on the mounting state satisfying a designated condition, acquire position information of a peripheral device linked with the electronic device;
   determine an extension direction of the flexible display based on the position information of the peripheral device; and
   control the first rolling actuator and/or the second rolling actuator to extend the flexible display in the first direction or the second direction based on the determined extension direction.

2. The electronic device of claim 1, wherein the at least one processor is configured to:
   determine a folding angle between the electronic device and a keyboard device operatively connected to the electronic device using at least one acceleration sensor; and
   based on the folding angle being within a first angle range, determine that the mounting state of the electronic device satisfies the designated condition.

3. The electronic device of claim 1, wherein the at least one processor is configured to control the display to display an interface related to the peripheral device through a first area of the flexible display extended in the first direction to be visible and a second area of the flexible display extended in the second direction to be visible.

4. The electronic device of claim 1, wherein the at least one processor is configured to:
   based on the position of the peripheral device being in a first lateral direction with reference to the electronic device, control the electronic device to drive the first rolling actuator to extend the flexible display in the first direction corresponding to the first lateral direction; and
   based on the position of the peripheral device being in a second lateral direction with reference to the electronic device, control the electronic device to drive the second rolling actuator to extend the flexible display in the second direction corresponding to the second lateral direction.

5. The electronic device of claim 1, wherein the at least one processor is configured to:
   detect an attachment/detachment signal of an electronic pen operatively connected to the electronic device;
   in response to a detachment signal indicating that the electronic pen is detached from the electronic device, control the electronic device to extend the flexible display; and
   in response to an attachment signal indicating that the electronic pen is attached to the electronic device, control the electronic device to contract the flexible display.

6. The electronic device of claim 5, wherein the at least one processor is configured to determine an extension direction of the flexible display based on at least one of position information, direction information, or angle information of the electronic pen.

7. The electronic device of claim 5, wherein the at least one processor is configured to, based on the electronic pen being detached from the electronic device, control the display to display a content related to the electronic pen on an area of the flexible display, and
   wherein the content related to the electronic pen comprises at least one of a pen color or a pen thickness.

8. The electronic device of claim 1, wherein the peripheral device corresponds to a portable terminal operatively connected to the electronic device, and
   wherein the at least one processor is configured to:
   control the electronic device to perform wireless communication with the mobile terminal; and
   in response to performing of the wireless communication, control the electronic device to drive at least one of the first rolling actuator or the second rolling actuator to extend the flexible display.

9. The electronic device of claim 1, wherein the at least one processor is configured to:
   acquire a signal of a keyboard device operatively connected to the electronic device;
   detect a floating mode in which the electronic device is floated from the keyboard device by a first distance or more, using at least one magnetic field sensor; and
   in response to the floating mode, control the first rolling actuator and/or the second rolling actuator to extend the flexible display in the first direction and/or the second direction.

10. The electronic device of claim 1, wherein the at least one processor is configured to:
    control the electronic device to extend the flexible display by a first length; and
    in response to an input in a state in which the flexible display is extended by the first length, control the electronic device to extend the flexible display by a second length longer than the first length.

11. A method of operating an electronic device, the method comprising:
    determining a mounting state of the electronic device;
    based on the mounting state satisfying a designated condition, acquiring position information of a peripheral device linked with the electronic device;
    determining an extension direction of a flexible display based on the position information of the peripheral device; and
    using a first rolling actuator or a second rolling actuator to extend the flexible display in a first direction or a second direction opposite to the first direction, based on the determined extension direction.

12. The method of claim 11, further comprising:
    determining a folding angle between the electronic device and a keyboard device operatively connected to the electronic device using at least one acceleration sensor; and
    based on the folding angle being within a first angle range, determining that the mounting state of the electronic device satisfies the designated condition.

13. The method of claim 11, further comprising:
    detecting an attachment/detachment signal of an electronic pen operatively connected to the electronic device;
    in response to a detachment signal indicating that the electronic pen is detached from the electronic device, extending the flexible display; and in response to an attachment signal indicating that the electronic pen is attached to the electronic device, contracting the flexible display.

14. The method of claim 11, further comprising:

based on the position of the peripheral device being in a first lateral direction with reference to the electronic device, driving the first rolling actuator to extend the flexible display in the first direction corresponding to the first lateral direction; and based on the position of the peripheral device being in a second lateral direction with reference to the electronic device, driving the second rolling actuator to extend the flexible display in the second direction corresponding to the second lateral direction.

15. The method of claim 11, wherein the peripheral device corresponds to a portable terminal operatively connected to the electronic device, and wherein the method comprises:

performing wireless communication with the mobile terminal; and in response to performing of the wireless communication, driving at least one of the first rolling actuator and/or the second rolling actuator to extend the flexible display.

\* \* \* \* \*